INVENTORS
LLOYD J. LAPOINTE
RALPH L. PARKER JR.

BY Thomas S. Ross
Albert W. Scribner
ATTORNEYS

INVENTORS
LLOYD J. LAPOINTE
RALPH L. PARKER JR.
BY Thomas S. Ross
Albert W. Scribner
ATTORNEYS

INVENTORS
LLOYD J. LAPOINTE
RALPH L. PARKER JR.

BY Thomas S. Ross
Albert W. Scribner
ATTORNEYS

March 30, 1965 L. J. LAPOINTE ETAL 3,175,671

PRINTING HEAD POSITIONING MEANS USING CIRCULAR CODE MEMBERS

Filed Nov. 2, 1961 6 Sheets-Sheet 4

INVENTORS
LLOYD J. LAPOINTE
RALPH L. PARKER JR.
BY Thomas S. Ross
Albert W. Scribner
ATTORNEYS INVENTORS
LLOYD J. LAPOINTE
RALPH L. PARKER JR.
BY Thomas S. Ross
Albert W. Scribner
ATTORNEYS INVENTORS
LLOYD J. LAPOINTE
RALPH L. PARKER JR.
BY Thomas S. Ross
Albert V. Scribner
ATTORNEYS 3,175,671

PRINTING HEAD POSITIONING MEANS USING CIRCULAR CODE MEMBERS

Lloyd J. Lapointe, West Hartford, and Ralph L. Parker, Jr., Ellington, Conn., assignors to Royal McBee Corporation, New York, N.Y., a corporation of New York Filed Nov. 2, 1961, Ser. No. 149,559
12 Claims. (Cl. 197—50)

This invention relates to an improved mechanism for positioning the printing head of a matrix type writing machine, and more particularly relates to a novel means for indexing a matrix head in two coordinate directions preparatory for a character printing operation.

In the operation of matrix type printing machines the selection of a given character usually involves the driving of the matrix head in two coordinate directions so as to bring a predetermined character to an operative position. Two independent but simultaneously operable drive means are provided for respectively displacing the matrix head in said two coordinate directions, each of the drive means being operable to displace the head through varying coordinate distances depending on the character to be printed. Certain operational difficulties have been characteristically experienced here in connection with the high speed displacement and final positioning of the matrix head.

One object of the instant invention is to provide a novel drive arrangement for more efficiently displacing a matrix type printing head from a normal position to successive print producing positions.

Another object of the invention is to provide a novel arrangement for controlling the variable extent of character selection movement of the matrix printing head in one coordinate direction.

Another object of the invention is to provide a novel arrangement for accurately finally positioning a matrix head during each printing cycle of the machine.

Another object of the invention is to provide a head positioning control device for a matrix type printer whereby a fixed stroke drive linkage may be selectively connected to the printing head in an improved variable manner so as to produce predetermined different indexing movements of said printing head.

Another object of the invention is to provide a novel arrangement of permutation code members which control the extent of indexing movement of the printing head in one coordinate direction.

Still another object of the invention is to provide a novel arrangement of code sensing elements which are capable of continually sensing a plurality of permutation code members and which selectively enable a plurality of individual cam means that control the extent of indexing movement of the printing head in one coordinate direction.

A further object of the invention is to provide a novel matrix head positioning means wherein a plurality of detent control pins are adapted to selectively move into operative position with respect to a plurality of cam grooves that respectively determine the angular extent of indexing movement of the matrix head in one coordinate direction.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
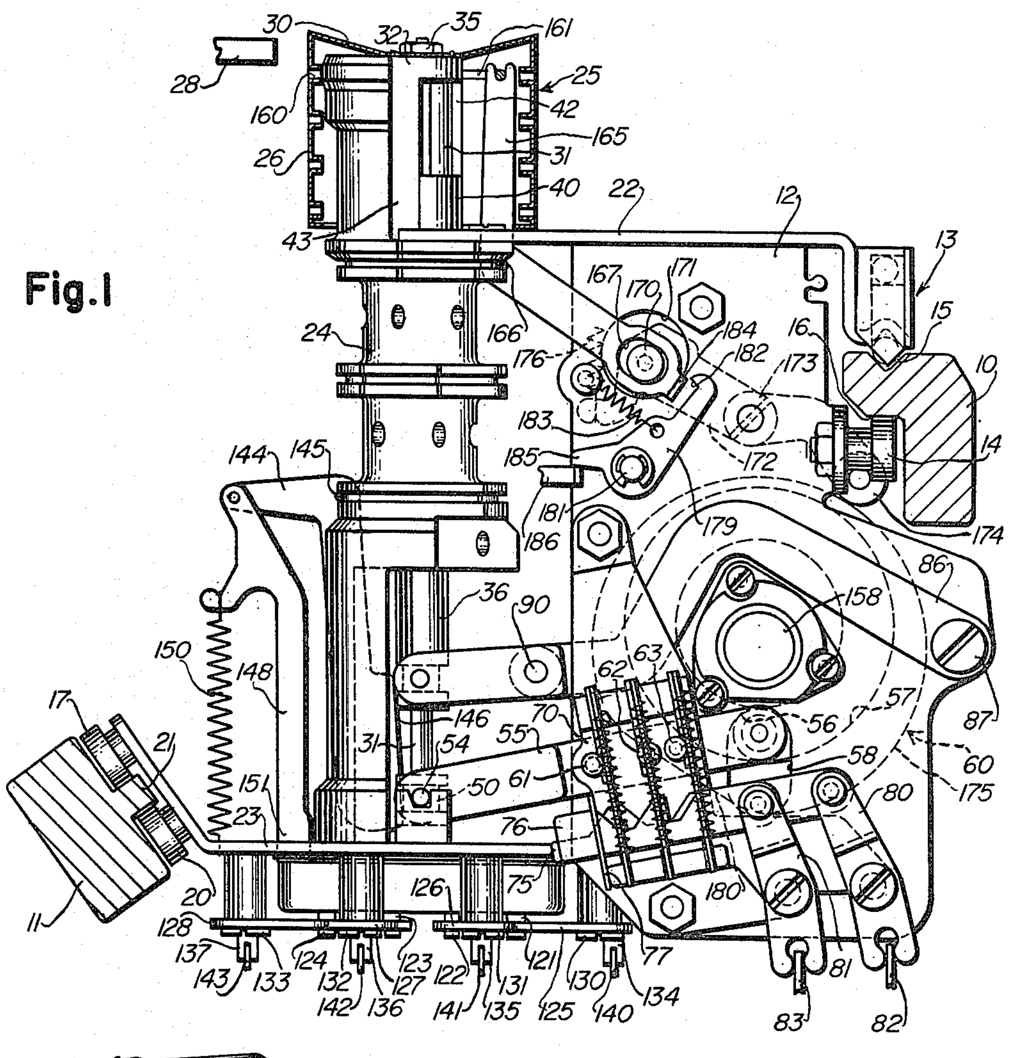
FIGURE 1 is a side elevational view illustrating the overall arrangement of the instant apparatus.

Referring to FIGURE 1 there is shown a pair of parallel carriage rails 10 and 11 which are disposed transversely of the machine and which are suitably secured to the machine side frames. A printing head supporting carriage frame 12 is arranged for movement along said rails. The upper front portion of the carriage is provided with a ball race 13 and a cylindrical roller 14 which operatively engage the upper grooved surface 15 and the flat bottom surface 16 of rail 10 respectively. The lower rearward part of the carriage is provided with a pair of cylindrical rollers 17 and 20 which engage the opposite sides of a longitudinal shelf 21 formed on rail 11. In and between the upper and lower rearward frame extensions 22 and 23 is secured a vertically disposed housing 24 which generally supports the matrix printing head 25 for movement from normal to printing positions.

Figure 2:
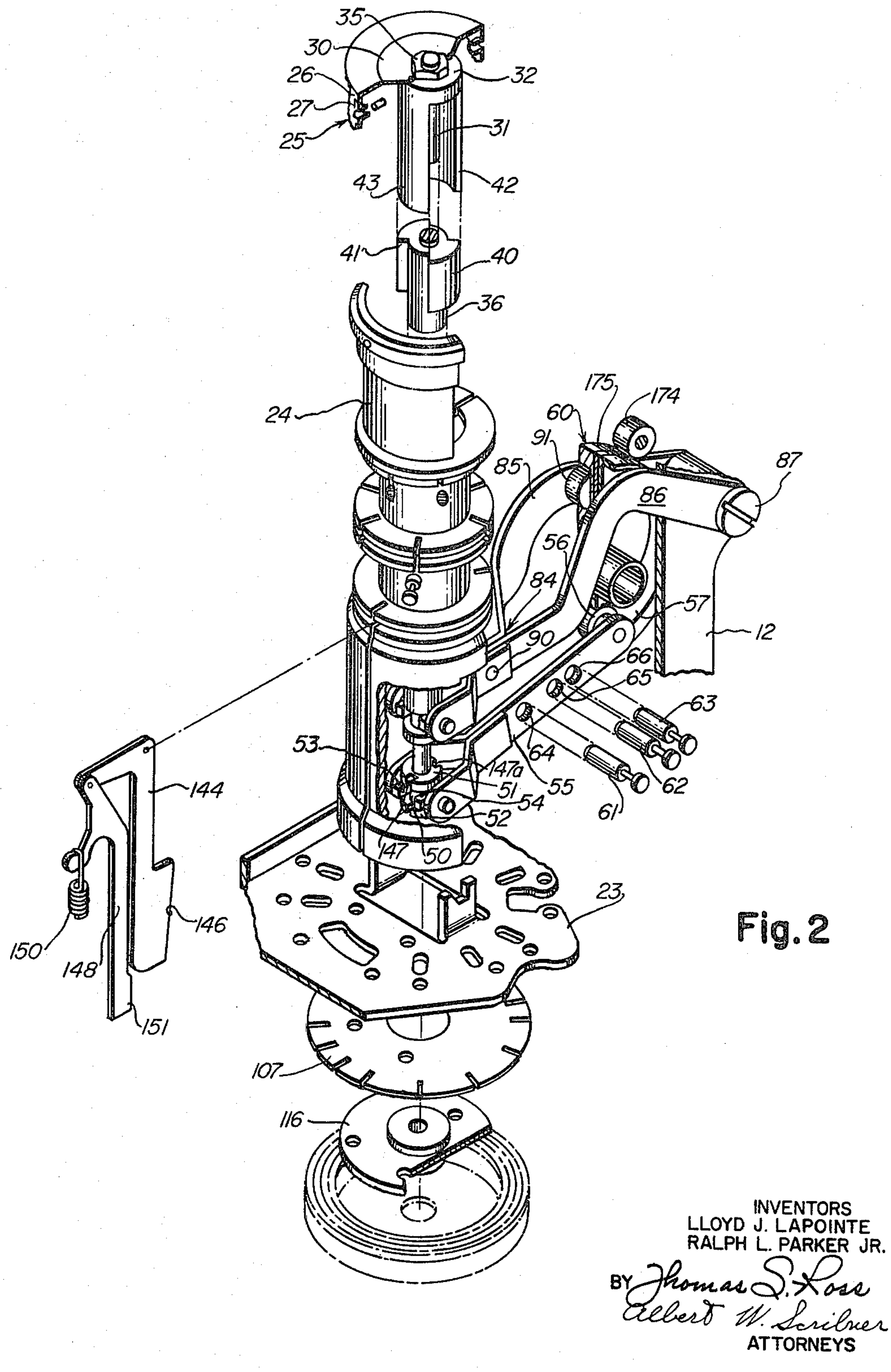
FIGURE 2 is an exploded perspective view of the immediate drive apparatus for the matrix printing head.
Figure 3:
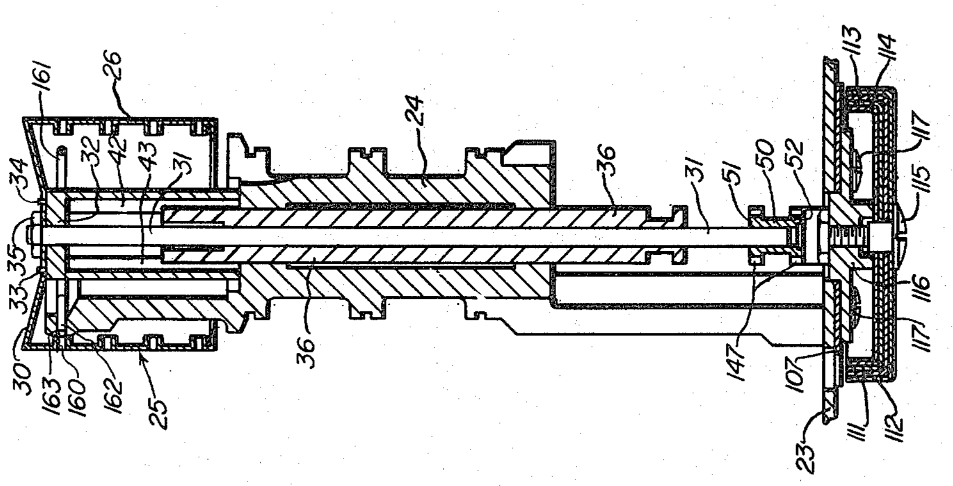
FIGURE 3 is an axial sectional view showing the matrix head supporting means.
Figure 5:
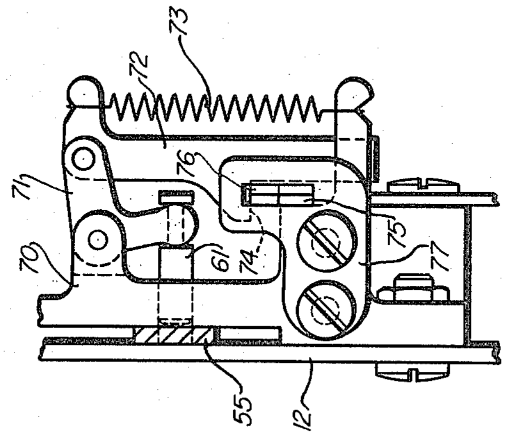
FIGURE 5 is a rear elevational view showing a portion of the axial head positioning control means.
Figure 6:
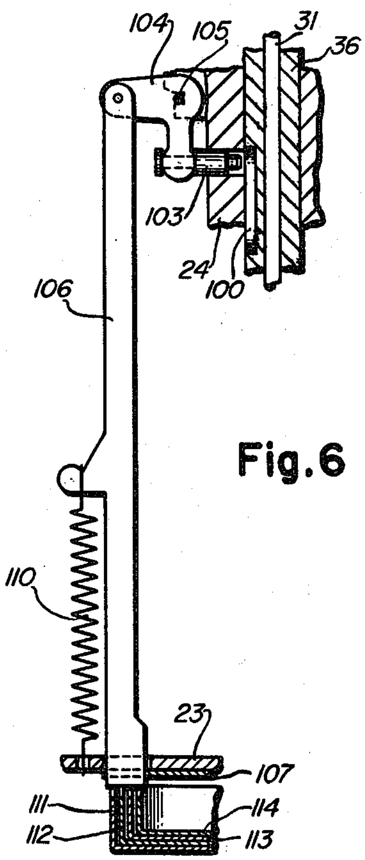
FIGURES 6 and 7 are normal and active partial axial sectional views, respectively, showing a portion of the rotational head positioning control means.

The details of the printing head and its immediate supporting and operating means will now be described with particular reference to FIGURES 2–6. As best shown in FIGURES 2 and 3 the printing head 25 comprises a cylindrical shell portion 26 on the outer side of which is formed a reticulated pattern or set of type such as 27. The printing head 25 is adapted to be axially and/or rotatably indexed in order to prevent one of the character types thereon to an operative position opposite a printing hammer 28, FIGURE 1. The upper end to the printing head is provided with an integral radial portion 30 having a central aperture through which a center shaft 31 passes. The shaft 31 is fixedly secured to a first splined member 32 which is formed with a pair of upstanding pins 33 and 34 that pass through corresponding locating holes in said radial portion 30 of the printing head. A nut 35 is threaded onto the upper end of shaft 31 so that this shaft, the splined member 32 and the printing head 25 are fixedly secured together in predetermined relative axial and rotative positions. A tubular sleeve or second splined member 36, FIGURES 3 and 6, is slidably mounted in housing 24 for axial movement on shaft 31 and has a pair of upper dovetail projections 40, 41 that are slidingly disposed between the complementally shaped depending projections 42, 43, FIGURE 2, formed on said first splined member 32. As will be apparent rotation of the second splined member 36 will serve to rotate the printing head while elevation of this second or splined member will have no elevating effect on the printing head. Thus the axial movement of shaft 31 and the first splined member 32 is used to axially displace the printing head 25, while the axial movement of sleeve 36 is used to rotate the printing head as will be presently described.

Figure 12:
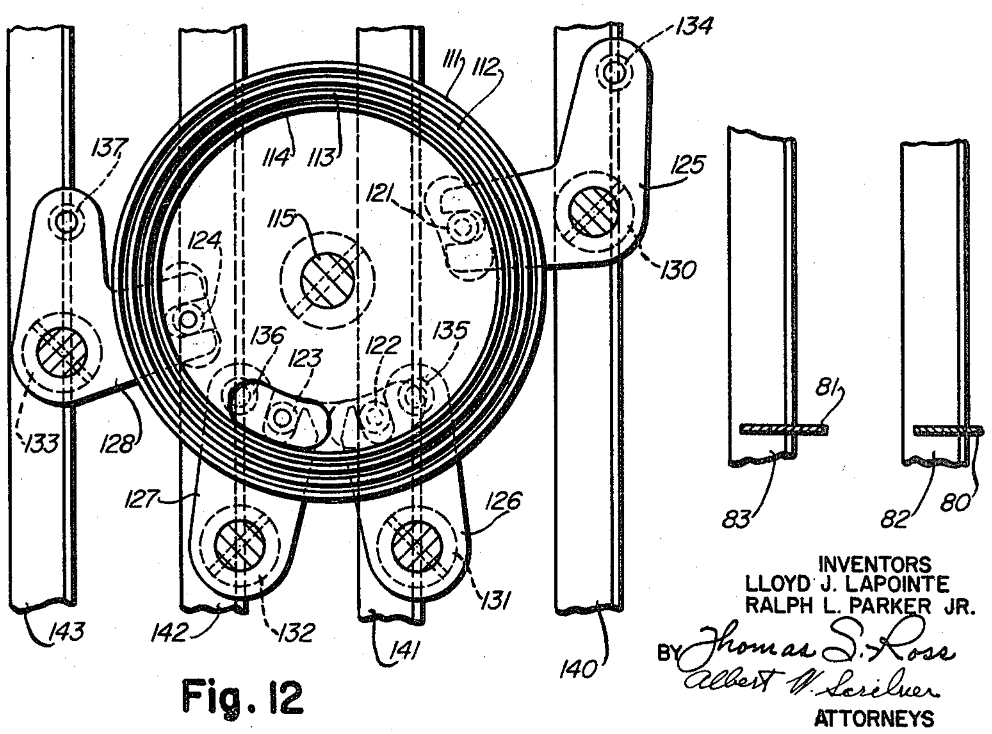
FIGURE 12 is a plan view showing the assembled condition of the code cups and related structure.

Drive means are provided for axially moving or elevating the shaft 31 (and thus the printing head 25) and also for controlling the extent to which said head and shaft are elevated. Considering first the head elevating means the lower end of shaft 31 has fixed thereto a collar 50, FIGURES 1, 2 and 3, which is formed with upper and lower flanges 51 and 52. A pair of opposed pin shoulders 53 and 54 are disposed between said flanges 51 and 52 and are pivotally mounted on the bifurcated end of an elevating or actuating lever 55. Lever 55 is adapted to be pivotally actuated by cam means about a variable positioned fulcrum in order to axially displace the printing head to varying extents. To this end the forward end of the lever rotatably supports a cam roller 56 that extends through a carriage frame aperture 58, FIGURE 1, and is disposed in the track 57, formed on one side face of a drive cam assembly 60, FIGURES 1, 2 and 13. As will be apparent one revolution of the drive cam assembly 60 will produce one cyclic upward and downward movement of the left end, FIGURE 1, of lever 55. The control means for determining the extent of elevation of head 25 is as follows. The fulcrum point for lever 55 is determined by which one of three pins 61, 62 and 63, FIGURE 2, is axially advanced into an associated one of three apertures 64, 65 and 66 formed in lever 55 and the means for controlling which fulcrum pin 61, 62 or 63 is advanced into a related lever aperture will be described with particular reference to FIGURES 1 and 5. The pin 61 is axially movably mounted by means of a bracket 70, FIGURE 5, that is fixedly mounted on the carriage frame 12. Pivotally mounted on bracket 70 is a bell crank 71 which has a depending leg that is positioned in driving engagement with the outer reduced end of the pin 61. The other leg of the bell crank is articulately connected to a sensing finger 72 that is biased downwardly by means of a spring 73 so that the bottom edge of the integral shoulder 74 is urged into engagement with the upper notched or camming edges of two code permutation slides 75 and 76. The support and moving means for pins 62 and 63 are similar to that just described for pin 61. The left ends, FIGURE 1, of the two code slides 75 and 76 are slidably supported in the aperture formed in the carriage frame bracket 77 while the other ends of said slides are respectively articulately connected to the upper ends of two control levers 80, 81 that are pivotally mounted on the carriage frame by any suitable means. The lower ends of levers 80, 81 are bifurcated as shown so as to be capable of respectively receiving the actuator bars 82 and 83, FIGURES 1 and 12, that extend transversely of the machine. Bars 82 and 83 are selectively operated in accordance with a predetermined code by means not shown. When the control lever 80 is operated by bar 82 the permutation slide 75 will be displaced to the right as seen in FIGURE 1 and the code bar sensing finger 72 will be lowered by spring 73 so that bell crank 71 pushes the pin 61 into the associated aperture 64, FIGURE 2, formed in the said printing head elevating lever 55. Restoration of control lever 80 to its normal position shown will cause the pin 61 to be withdrawn from said lever aperture 64. When the control lever 81 is operated the permutation slide 76 is displaced so that pin 62 is similarly advanced and withdrawn into and from the aperture 65 of lever 55. When both control levers 80 and 81 are operated both permutation slides 75 and 76 are displaced so that pin 63 is advanced and withdrawn into and from the lever aperture 66. Thus the fulcrum point for the printing head elevating lever 55 may be varied as desired whereby the output or left end, FIGURE 1, of lever 55 may partake of differential operating strokes in response to the fixed stroke displacement of the other end thereof produced by the cam assembly 60. In this way the printing head 25 may be cyclically elevated to any one of three different positions above the normal position shown in FIGURES 1 and 3.

The means for axially actuating the sleeve 36 to produce a rotational indexing of head 25 comprises a bail 84, FIGURE 2, having a pair of arms 85 and 86, the forward ends of which are pivotally mounted on the carriage frame 12 by means of a stud 87 while the rearward ends thereof are mutually fastened together by a rivet 90. The bifurcated rearward end of arm 86 is operatively coupled to the lower end of the sleeve 36 by means of a swivel connection that is similar to that defined by the collar 51 and the pins 53 and 54 between the shaft 31 and arm 55. The bail arm 85 has a roller 91 rotatably mounted thereon which is operatively disposed in the cam track 92 on the side face of said cam assembly 60, FIGURES 2 and 14. As will be apparent one revolution of the cam assembly 60 will produce one cyclic upward and downward movement of the bail 84.

Figure 15:
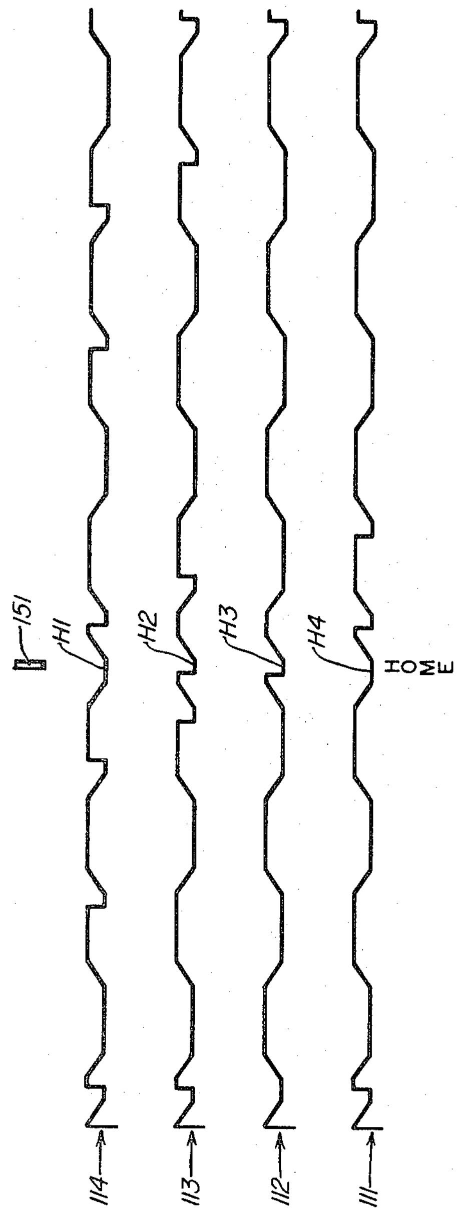
FIGURE 15 is a diagrammatic sketch illustrating pattern of notches on the respective code cups of FIGURES 8–11.
Figure 7:
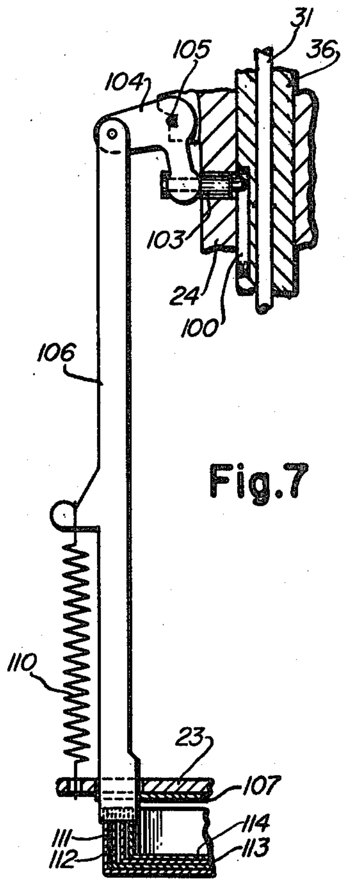

The means for controlling the amount of rotation of the printing head 25 produced by the independent elevation of sleeve 36 by bail 84 will now be discussed in connection with FIGURES 3, 4, 6 and 7. The tubular sleeve or second splined member 36, FIGURE 3, is free for axial movement relative to the first splined member 32 but is rotatably locked with the latter. In order to rotate sleeve 36 and thus the head 25, the outer shank portion of said sleeve is provided with a three sets of helical type grooves 100, 101 and 102, as shown in the flat developed view of FIGURE 4. Radially mounted in the walls of the cylindrical housing 24 are a plurality of interposer pins such as is shown at 103 of FIGURE 6, which are respectively adapted to axially move into and out of an associated one of the grooves in sleeve 36. When a pin is engaged in one of the sleeve grooves an upward displacement of sleeve 36 will cause a simultaneous rotation of the latter due to the camming engagement of the helical groove walls with the stationary pin. The outer reduced end of pin 103 is operatively engaged by the depending leg of a bell crank 104 that is pivotally mounted on the carriage housing 24 by means of a suitable wire pin 105. Articulately connected to the other leg of the bell crank 104 is a code sensing bar 106 that extends downwardly through a suitable slot in the carriage frame extension 23 and through a suitable radial slot in the guide plate 107, FIGURES 2, 3 and 6 secured to the lower side of the said frame extension 23. The bar 106 is biased downwardly by a spring 110 so that the lower end thereof is urged into engagement with the upper notched edges of four coaxially nested code cups 111, 112, 113 and 114. The code cups are rotatably mounted on a stud 115, FIGURE 3, that is threaded into a circular plate 116 which in turn is fixed to carriage frame extension 23 by means of screws 117. The code cups 111–114 are individually shown in FIGURES 8–11 respectively and in assembled condition in FIGURES 2, 3 and 12. The notches in the upper edges of said cups which are not shown in FIGURES 8–11 are shown best in FIGURES 6 and 7 and are schematically developed in FIGURE 15. As will be apparent when the code cups 111–114 are rotatably indexed so that a notch in each cup is located immediately below the lower end of the sensing bar 106 the spring 110 will pull the bar downwardly into the radially aligned cup notches, as shown in FIGURE 7, and will thereby move pin 103 into an associated helical groove in the sleeve 36. When the sleeve 36 is thereafter elevated as above described it will be cammed through a rotational distance corresponding to the shape of said associated helical groove that is cammingly cooperating with the set pin 103. This independent rotation of sleeve 36 will be transmitted to the printing head 25 through the depending dovetail projections 42 and 43 of the first splined member 32. Lowering of sleeve 36 will restore the printing head to its normal rotative position. Each of the grooves in the groove sets 100, 101 and 102, FIGURE 4, cooperate with an associated pin in a manner similar to that just described. The grooves in set 100 are contoured so as to produce varying angular displacements of the printing head in the opposite rotative direction. The endless case shift groove set 102 is really a continuous single groove which is adapted to rotatably index the printing head 25 through 180 degrees for each cyclic upward and downward movement of the sleeve 36. During any given printing cycle the particular direction and extent of angular indexing of the printing head 25 will be determined by which pin, such as 103, FIGURE 6, has been selected and advanced into its associated groove. This selection of course is here controlled by the code cups whose upper edge notches which, as illustrated in FIGURE 15, cooperatively define a permutation system for the selection of the successive rotary printing positions of the head 25.

Means are provided for selectively indexing the code cups 111–114; such means including pins 121, 122, 123 and 124, FIGURES 1, 8–12, that are respectively secured to said cups 111–114. These pins extend downwardly through suitable arcuate slots formed in the next cup or cups below and are respectively engaged at their lower ends by the bifurcated ends of four bell cranks 125, 126, 127 and 128, FIGURES 1 and 12, that are respectively pivotally mounted on the carriage frame 12 by means of pivot studs 130, 131, 132 and 133. The other ends of the bell cranks respectively rotatably support the depending pins 134, 135, 136 and 137 which are slotted at their lower ends so as to respectively receive the upstanding legs of the four transversely disposed actuator bars 140, 141, 142 and 143, FIGURES 1 and 12. As will be apparent when the bars 140–143 are selectively displaced in a leftward direction as viewed in FIGURE 12 the respectively associated bell cranks 125–128 will be rocked thereby rotatably indexing the associated code cups 111–114. For each indexing operation of the permutation code cups one of the pins such as 103, FIGURE 6, will be moved inwardly to an operative position in one of the sleeve grooves as illustrated in FIGURE 7, so that when the sleeve 36 is subsequently elevated by the bail 84 the sleeve 36 together with the printing head 25 will be rotatably indexed by a predetermined amount.

When the matrix head is in its normal home position there will be no pins such as 103, FIGURES 6 and 7, in interposing engagement with the grooves in sleeve 36. In this situation then the head 25 would be free for undesired random rotational movement away from the home position. Means are provided for holding the matrix head in a fixed rotative home position, such means comprising a detent lever 144, FIGURES 1 and 2, which is pivotally mounted on the carriage housing 24 by means of a suitable pin 145 and which has a lower forward edge 146 that is movable into detenting engagement with aligned slots 147, FIGURE 2, formed in the flanges of the collar 51. When said detent lever edge 146 is moved radially out of slots 147 the head 25 is free to be rotatably indexed for a printing operation. In order to disengage and engage this detenting means respectively at the beginning and end of a printing cycle the lever 144 is articulately connected to an operating bar 148 which is biased downwardly by a spring 150 so that the lower edge 151 thereof engages the coded notches in said code cups 111–114. As is best illustrated in FIGURE 15 when the code cups are in their rotative home positions the respective notches H1, H2, H3 and H4 in the cups will radially register with each other and also with the lower edge 151 of said arm 148 whereby spring 150 can move bar 148 downwardly and thereby swing the said lever edge 146 into detenting engagement with said collar slots 147. As soon as and as long as any one or more of said code cups are rotatably indexed away from their normal positions the arm 148 will be elevated as viewed in FIGURES 1 and 2, and the lever edge 146 will thus be swung out of detenting engagement with said collar slots 147 so that the printing head is free to be indexed to and from an operative printing position as above described.

Figure 13:
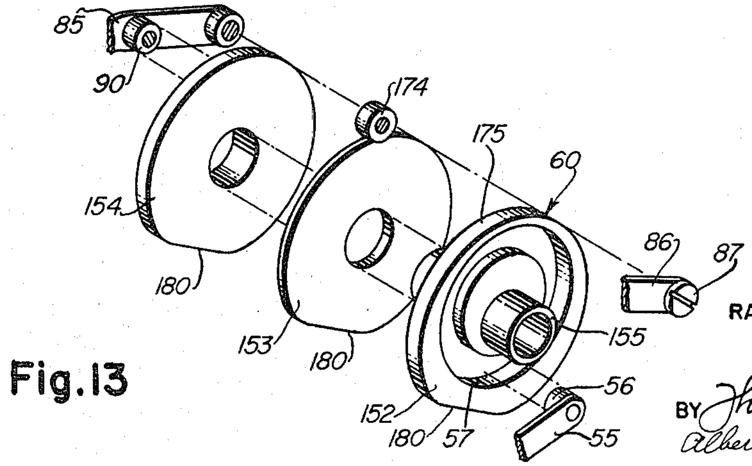
FIGURE 13 is an exploded perspective view of the drive cam assembly.
Figure 14:
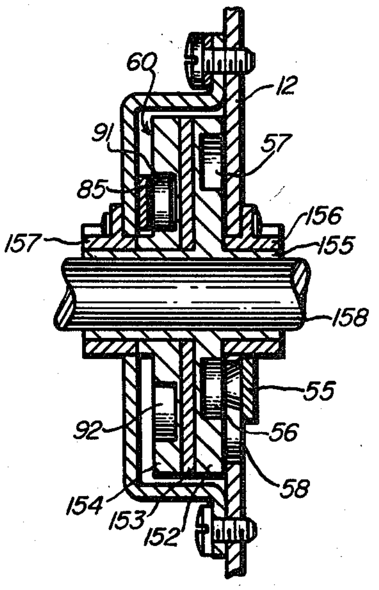
FIGURE 14 is a diametral sectional view of the drive cam assembly.
Figure 8:
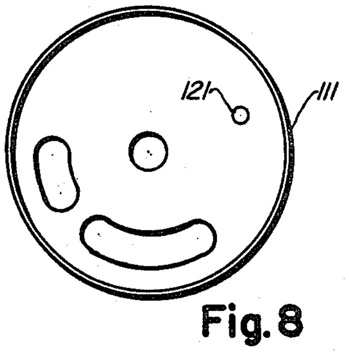
FIGURES 8–11 are plan views respectively showing the individual permutation code cups of the instant apparatus.
Figure 9:
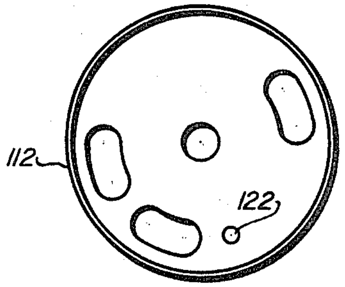
Figure 10:
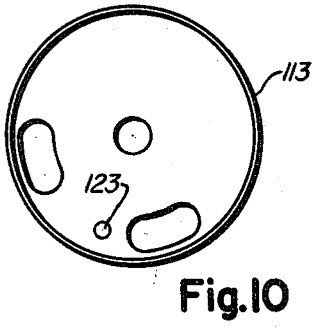
Figure 11:
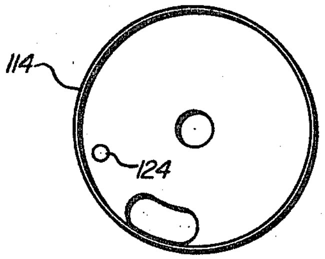

The cam assembly 60 for elevating and rotating the printing head 25 as above described is comprised of three mutually fixed cam sections, 152, 153 and 154, FIGURES 13 and 14, that have the same outer peripheral profile; section 152 being integral with a tubular hub 155, FIGURE 14, that is rotatably supported by bearing bushings 156 and 157 mounted on the carriage frame 12. A main drive shaft 158 passes through hub 155 and has a splined connection with the latter, i.e. the main shaft 158 can rotatably drive the cam assembly 60 as the carriage frame 12 moves axially along the length of the main shaft 158. The main shaft 158 is adapted to be rotated through one revolution during each cyclic printing operation of the machine.

Figure 4:
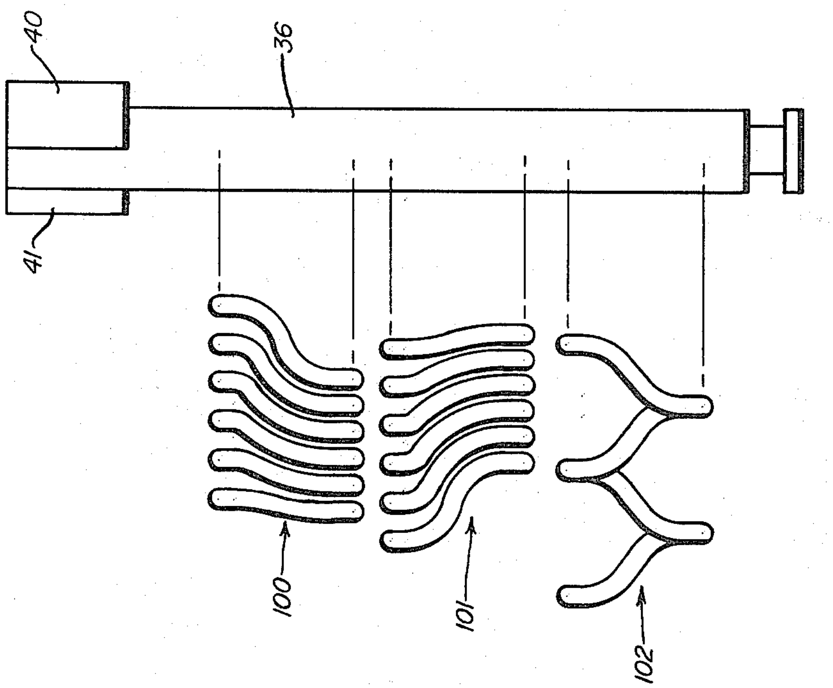
FIGURE 4 is an elevational view of the tubular head indexing sleeve and shows the developed contours of the grooves formed therein.

The instant matrix head 25 has all the lower case characters distributed around a 180 degree portion of said matrix surface. When a case shift operation is called for the code cups 111–114 will be rotatably indexed so that the pin, similar to 103 of FIGURES 6 and 7, associated with the continuous sleeve groove 102 of FIGURE 4 is advanced into operative engagement with said groove 102. During the ensuing one revolution of the main drive shaft 156 the matrix head 25 will be rotated through an additional 90 degrees on the down stroke thereof. At the end of the cyclic operation the upper case characters will be operatively located so as to be selected for printing in response to the continued cyclic operation of the machine. When the head 25 is conditioned for printing upper case characters the detent lever edge 146, FIGURE 1, will cooperate with the slots 147*a*, FIGURE 1, formed in the said collar 51. Slots 147 and 147*a* are located in diametrally opposed positions in collar 51. When the head is to be again conditioned for printing lower case characters the said pin associated with the continuous groove 102 will be moved into the latter so that during the one revolution of the main shaft 158 the head will be again rotated through 180 degrees back to normal condition, i.e. 90 degrees during the up stroke of sleeve 36 and an additional 90 degrees during the down stroke of the sleeve. The shift and unshift rotational indexing of head 25 always occurs in the same rotational direction. As will be apparent the shift and unshift operations each require one cyclic operation of the machine in much the same manner as a regular printing cycle.

When the matrix printing head 25 is indexed to a desired printing position it is advisable to have a means for accurately locating the head in its final printing position. For this purpose the instant printing head 25 is provided with a locating hole such as 160, FIGURES 2 and 3, adjacent each of the type on the head periphery. A wire loop 161, FIGURES 2 and 3, is provided which is disposed inside the printing head and which has a rearwardly extending finger 162 that is axially movable in the aperture 163 of the housing 24 so as to be movable into and out of detenting engagement with a reigstering one of said holes such as 160 formed in the matrix head. This detenting and locating action of the loop finger 162 must occur at about the time of printing and hence must be effected in timed relation to the operation of other parts of the head positioning device. To this end the forward side of the wire loop is engaged and supported by the bifurcated end of a bell crank 165, FIGURE 1, that is pivotally mounted on the housing 24 by means of a suitable pin 166. The forward end of bell crank 165 is formed with a slot 167 in which is disposed a stud 170 that extends through a carriage frame aperture 171 and is secured to the rearward end of a lever 172. Lever 172 is pivotally mounted on the carriage frame 12 by means of a stud 173 and has rotatably mounted on its forward end a roller 174 FIGURES 1 and 2, that engages the outer peripheral camming surface 175 of said cam assembly 60. The lever 172 is biased in a clockwise direction, as seen in FIGURE 1, by a spring 176 so that the connected bell crank 165 normally urges the detenting and locating wire loop towards the left, FIGURE 1, to an advanced or detenting position; the action of spring 176 also simultaneously urging the roller 174 into peripheral engagement with cam assembly 60. The peripheral profile of the cam assembly 60 is such as to retain the wire loop finger 162 in a withdrawn or inoperative position shown in FIGURE 3 until the head has been indexed and printing is to occur. At this time in the cycle the flat portion 180, FIGURES 1 and 13, of the peripheral surface of cam assembly 60 permits the cam follower lever 172 to be spring driven in a clockwise direction, FIGURE 1, which produces a counter clockwise movement of bell crank 165. This motion of the bell crank will advance the wire loop finger to the left, as seen in FIGURES 1 and 3, so as to move into the hole in the matrix head 25 that is related to the character to be printed. Thus when the printing action occurs the printed character will always be consistently accurately oriented and positioned with respect to the printing point of the machine. After printing has occurred the loop finger 162 will be withdrawn and the matrix head will be free to be returned to its normal position preparatory for the next printing cycle.

The head detenting mechanism just described operates during each cyclic revolution of the cam assembly 60 with one exception. This exception being when a case shift operation occurs and when this takes place it is preferable to disable the head detenting action. A latch 179, FIGURE 1, pivotally mounted on the carriage frame 12 by means of a pin 181 is provided for latching the bell crank 165 against biasing action of the actuating spring 176. Here latch 179 is formed with a detent shoulder 182 and is biased in a counter clockwise direction by means of a spring 183. The rearward extending end 185 of latch 179 overlies a projection 186 formed in the bell crank, such as 104, FIGURE 6, associated with the case shift control linkage. The projection 186 normally holds latch 179 in an inoperative position. When a case shift operation is called for by the appropriate indexing of the code cups 111–114 the operation of said case shift control linkage will rotate latch 179 in a counter clockwise direction so as to prevent the normal counter clockwise movement of bell crank 165 and the operative advance of the head detenting wire loop 161. In this way no head detenting action occurs during the case shift operation. When the head 25 is restored to a normal lower case condition the latch 179 is restored to and held in its normal inoperative FIGURE 1 position by the said projection 186.

A general statement will be made of the operation of the instant matrix head positioning means during a typical printing cycle. The six transversely disposed control bars 82, 83 and 140–143, FIGURE 1, are adapted to be displaced to the left as seen in FIGURE 1 in coded combinations depending on the code designation for the character to be printed. Let it be assumed that the letter "n" is to be printed and that the elevational coordinate control bar 82 and the rotation coordinate control bar 143 are thereby actuated. When these two control bars are operated the pin 61 will be advanced to fulcrum the lever 55 and the code cups 111–114 will now permit a predetermined pin, such as 103, of FIGURE 7 to move into interposing engagement with an associated groove in said sleeve 36. After the axial and rotational control means for the printing head have thus been conditioned the main shaft 158 is driven through one revolution and the resultant simultaneous elevation of lever 55 and the bail 84 will respectively axially and rotationally index the printing head to a position wherein the character "n" is located opposite the printing hammer 28. The head detenting wire loop finger 162 will then advance into the head aperture adjacent the letter "n" so as to accurately position and fix the printing head with respect to the printing hammer 28, FIGURE 1. After the hammer has partaken of its printing stroke the wire finger 162 is withdrawn and the head is free to be restored to its normal position by the lowering of the lever 55 and the bail 84. When arriving at said home position the locking lever 148 will swing into detenting engagement with the collar slots 147 so as to lock said printing head in said normal position. The rotary displacement of the printing head occurs in one direction and then the other during the respective first and second halves of a printing cycle. When a case shift operation is called for the resultant upward and downward strokes of bail 84 will each produce a 90 degree displacement of the head in the same rotational direction so that the head is thereafter conditioned for printing upper case characters. It will be understood that the location for upper characters are diametrally opposed to the corresponding lower case character.

While there is in this application specifically described one form which the invention may assume in practice, it will be understood that this form of the same is shown for purposes of illustration only and that the invention may be modified and embodied in various other forms without departing from its spirit or the scope of the appended claims.

The invention claimed is:

1. In a printing machine; a matrix type printing head, means for supporting said head for movement in two coordinate directions, a pair of independent cyclically operable power drive means for respectively displacing said head in said two coordinate directions; one of said drive means including a first member, a plurality of cam grooves formed in said member, a plurality of pins respectively adapted to move into and out of operative positions in said grooves, a plurality of circular notched permutation members, power operated means for successively indexing said permutation members, and means for continually sensing the notches in said permutation members so as to selectively displace said pins into said grooves in predetermined sequence during the successive cyclic operations of the associated drive means.

2. In a matrix type printing machine; a printing head having a plurality of characters formed thereon power means for respectively indexing said head in two coordinate directions, two independently operable control means for determining the respective extents of movement of said head in said directions, one of said control means comprising a driven member having a plurality of cam grooves of varying effective throws, a cam groove interposer pin associated with each of said grooves, permutation means for determining which one of said pins is conditioned for cooperation with its associated cam groove, and means for operating one of said power means to actuate said grooved member to displace said head in one of said coordinate directions by an amount determined by which one of said pins is conditioned for cooperation with its said associated cam groove.

3. In a matrix type printing machine, in combination, a printing head having a plurality of type characters thereon, means supporting said head for movement in two coordinate directions, cyclically operable drive means movably supported by said first means and connected to said head for moving it in said coordinate directions, one of said drive means comprising a member having a plurality of cam surfaces of different configuration thereon, a plurality of settable interposer elements mounted on said supporting means and adapted respectively to move into and out of operative interposing engagement with said cam surfaces, permutation means selectively operable to move one of said interposer elements into operative engagement with one of said cam surfaces, and means to operate said member subsequent to engagement between said one interposer element and its associated cam surface to move said head in one coordinate direction.

4. In a matrix type printing machine, in combination, a printing head having a plurality of type characters thereon, means supporting said head for coordinate and simultaneous variable vertical and horizontal rotary movement, means associated with said supporting means for moving said head vertically, means associated with said second means for rotating said head, cyclically operable means for driving said two last mentioned means, said head rotating means including a plurality of cam elements, a plurality of settable interposer members respectively movable into and out of operative engagement with said elements whereby when one of said members engages its associated element and said operable means is operated said head is rotated, and permutation means selectively connectable with said members and operable to determine the extent of rotation of said head.

5. In a matrix type printing machine, in combination, a printing head having a plurality of type characters thereon, means supporting said head for coordinate and simultaneous variable vertical and horizontal rotary movement, means associated with said supporting means for moving said head vertically, means associated with said second means for rotating said head, cyclically operable means for driving said two last mentioned means, said head rotating means including a plurality of cam elements, a plurality of cam settable interposer members respectively movable into and out of operative engagement with said elements whereby when one of said members engages its associated element and said operable means is operated said head is rotated, and permutation means selectively connectable with said second means and operable to determine the extent of vertical movement of said head.

6. In a matrix type printing machine, in combination, a printing head having a plurality of type characters thereon, means supporting said head for coordinate and simultaneous variable vertical and horizontal rotary movement, means associated with said supporting means for moving said head vertically, means associated with said second means for rotating said head, cyclically operable means for driving said two last mentioned means, said head rotating means including a plurality of cam elements, a plurality of cam settable interposer members respectively movable into and out of operative engagement with said elements whereby when one of said members engages its associated element and said operable means is operated said head is rotated, and additional cam and follower means associated with said head rotating means and said permutation means and settable upon selective operation of said permutation means to effect a case shift rotative movement of said head.

7. Mechanism according to claim 6 including means operated in timed relation to the operation of said head moving means and said head rotating means for locking said head in its printing position.

8. Mechanism according to claim 7 including means to disable said head locking means on the occasion of a case shift movement of said head.

9. Mechanism according to claim 3 wherein said supporting means and said cyclically operable drive means comprise three relatively axially movable members having a common axis.

10. Mechanism according to claim 3 wherein said permutation means includes a plurality of differently notched relatively movable members responsive to manipulation of the printing machine to encode a signal.

11. Mechanism according to claim 3 wherein said permutation means includes a plurality of control elements adapted to be displaced in coded combinations depending on the code designation for the type character to be printed.

12. Mechanism according to claim 3 wherein said pair of drive means comprises an inner shaft and an outer sleeve that are coaxial and relatively movable axially of one another, said shaft being fixedly connected to said printing head and said sleeve being slidably connected to said head.

References Cited by the Examiner

UNITED STATES PATENTS

| | | | |
|---|---|---|---|
| 410,629 | 9/89 | Arnold | 197—49 |
| 605,619 | 6/98 | Wentscher | 197—30 |
| 752,795 | 2/04 | Moya | 197—50 X |
| 2,565,985 | 8/51 | Norton et al. | 197—49 |
| 2,643,753 | 6/53 | Wohlgemuth | 197—18 |
| 2,861,668 | 11/58 | Beccio | 197—16 |
| 2,919,002 | 12/59 | Palmer | 197—16 |
| 2,945,576 | 7/60 | Lapointe et al. | 197—18 X |
| 3,085,670 | 4/63 | Paige | 197—50 X |

FOREIGN PATENTS

| | | |
|---|---|---|
| 513,552 | 11/20 | France. |

ROBERT E. PULFREY, *Primary Examiner.*

ROBERT A. LEIGHEY, *Examiner.*